(12) United States Patent
Wieczorek et al.

(10) Patent No.: US 8,210,567 B2
(45) Date of Patent: Jul. 3, 2012

(54) SEAT SIDE AIRBAG SEAM

(75) Inventors: Joseph P. Wieczorek, Lake Orion, MI (US); Timothy Owen Hamlin, Warren, MI (US); William Bredo Berghoff, Brighton, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 418 days.

(21) Appl. No.: 11/488,324

(22) Filed: Jul. 18, 2006

(65) Prior Publication Data

US 2008/0018082 A1 Jan. 24, 2008

(51) Int. Cl.
*B60R 21/207* (2006.01)
*B60R 21/2165* (2011.01)

(52) U.S. Cl. .................... 280/730.2; 280/728.3

(58) Field of Classification Search .............. 68/247; 112/470.27, 147, 10, 11; 280/728.3, 730.2; 297/218.1, 218.2, 218.3, 218.4, 218.5, 216.14, 297/216.1, 219.1, 452.62, 452.58
See application file for complete search history.

(56) References Cited

U.S. PATENT DOCUMENTS

| | | | | |
|---|---|---|---|---|
| 5,382,398 | A | * | 1/1995 | Draxlmaier, Jr. ............ 264/46.5 |
| 5,492,073 | A | | 2/1996 | Abraham |
| 5,511,821 | A | | 4/1996 | Meyer et al. |
| 5,733,001 | A | * | 3/1998 | Roberts ...................... 297/218.1 |
| 5,749,597 | A | * | 5/1998 | Saderholm ................. 280/728.2 |
| 5,762,363 | A | | 6/1998 | Brown et al. |
| 5,788,272 | A | | 8/1998 | Yanase |
| 5,816,610 | A | | 10/1998 | Higashiura et al. |
| 5,816,660 | A | | 10/1998 | Johnson, III |
| 5,826,938 | A | | 10/1998 | Yanase et al. |
| 5,829,779 | A | | 11/1998 | Nakashima et al. |
| 5,829,827 | A | | 11/1998 | Schaper et al. |
| 5,845,966 | A | | 12/1998 | Severinski et al. |
| 5,860,673 | A | * | 1/1999 | Hasegawa et al. ......... 280/730.2 |
| 5,863,063 | A | * | 1/1999 | Harrell ....................... 280/730.2 |
| 5,893,579 | A | * | 4/1999 | Kimura et al. ............. 280/730.2 |
| 5,927,749 | A | | 7/1999 | Homier et al. |
| 5,951,039 | A | | 9/1999 | Severinski et al. |
| 5,967,546 | A | | 10/1999 | Homier et al. |
| 5,967,603 | A | | 10/1999 | Genders et al. |
| 5,975,567 | A | | 11/1999 | Higashiura |
| 5,997,032 | A | | 12/1999 | Miwa et al. |
| 6,029,993 | A | | 2/2000 | Mueller |
| 6,045,151 | A | | 4/2000 | Wu |
| 6,074,003 | A | | 6/2000 | Umezawa et al. |
| 6,095,602 | A | | 8/2000 | Umezawa et al. |
| 6,151,926 | A | | 11/2000 | Leeke et al. |
| 6,206,410 | B1 | | 3/2001 | Brown |
| 6,213,498 | B1 | | 4/2001 | Ghalambor et al. |

(Continued)

FOREIGN PATENT DOCUMENTS

JP 10085086 A * 4/1998

*Primary Examiner* — Joseph Rocca
*Assistant Examiner* — Laura Freedman
(74) *Attorney, Agent, or Firm* — Raggio & Dinnin, P.C.

(57) ABSTRACT

A seam for use in a seat of a vehicle having a side airbag that deploys through a cover of the vehicle seat. The seam including a first material and a second material joined to the first material. A monofilament member used to join the first material to the second material. The monofilament member will allow for quicker and easier tearing of the seam thus allowing for more complete and quicker deployment of the airbag through the vehicle seat cover to protect the occupant from contact with interior surfaces of a vehicle.

8 Claims, 1 Drawing Sheet

U.S. PATENT DOCUMENTS

| | | |
|---|---|---|
| 6,237,934 B1 | 5/2001 | Harrell et al. |
| 6,254,122 B1 | 7/2001 | Wu et al. |
| 6,296,802 B1 | 10/2001 | Blazaitis et al. |
| 6,409,210 B1 | 6/2002 | Emerling |
| 6,443,525 B1 | 9/2002 | Haupt |
| 6,568,707 B2 | 5/2003 | Hier et al. |
| 6,588,838 B1 | 7/2003 | Dick, Jr. et al. |
| 6,630,220 B1 | 10/2003 | Veiga |
| 6,688,640 B1 | 2/2004 | Davis, Jr. et al. |
| 6,792,883 B2 * | 9/2004 | Ashton .................... 112/475.01 |
| 6,848,707 B2 | 2/2005 | Bauer et al. |
| 6,851,704 B2 | 2/2005 | Davis, Jr. et al. |
| 6,886,479 B1 | 5/2005 | Hori |
| 6,886,858 B2 | 5/2005 | Olson |
| 6,926,792 B1 | 8/2005 | Valkenburg et al. |
| 6,964,453 B1 * | 11/2005 | Flegal et al. ............... 297/452.6 |
| 6,997,126 B2 * | 2/2006 | Murley .................... 112/475.06 |
| 7,278,363 B2 * | 10/2007 | Wieczorek et al. ...... 112/475.06 |
| 7,543,847 B2 * | 6/2009 | Tracht ........................ 280/730.2 |
| 7,681,910 B2 * | 3/2010 | Wieczorek et al. ......... 280/730.2 |
| 7,690,723 B2 * | 4/2010 | Evans et al. ............... 297/216.13 |
| 7,695,064 B2 * | 4/2010 | Thomas et al. .......... 297/216.16 |
| 2002/0130537 A1 | 9/2002 | Lotspih |
| 2003/0207068 A1 * | 11/2003 | Fujita et al. ..................... 428/57 |
| 2004/0195029 A1 * | 10/2004 | Feldman ....................... 180/271 |
| 2004/0227335 A1 | 11/2004 | Acker et al. |
| 2005/0081770 A1 * | 4/2005 | Murley et al. ............ 112/475.06 |
| 2005/0156412 A1 | 7/2005 | Panagos et al. |
| 2005/0258624 A1 | 11/2005 | Abraham et al. |
| 2006/0113754 A1 * | 6/2006 | Tracht ........................ 280/728.3 |
| 2006/0113761 A1 * | 6/2006 | Tracht ........................ 280/730.2 |
| 2006/0113762 A1 * | 6/2006 | Tracht et al. ............... 280/730.2 |
| 2006/0113763 A1 * | 6/2006 | Tracht et al. ............... 280/730.2 |
| 2006/0113764 A1 * | 6/2006 | Tracht ........................ 280/730.2 |
| 2006/0113765 A1 * | 6/2006 | Tracht ........................ 280/730.2 |
| 2006/0113768 A1 * | 6/2006 | Tracht et al. ............... 280/730.2 |
| 2009/0001784 A1 * | 1/2009 | Wieczorek et al. ......... 297/216.1 |
| 2010/0048079 A1 * | 2/2010 | Fujiyama et al. ............. 442/189 |

* cited by examiner

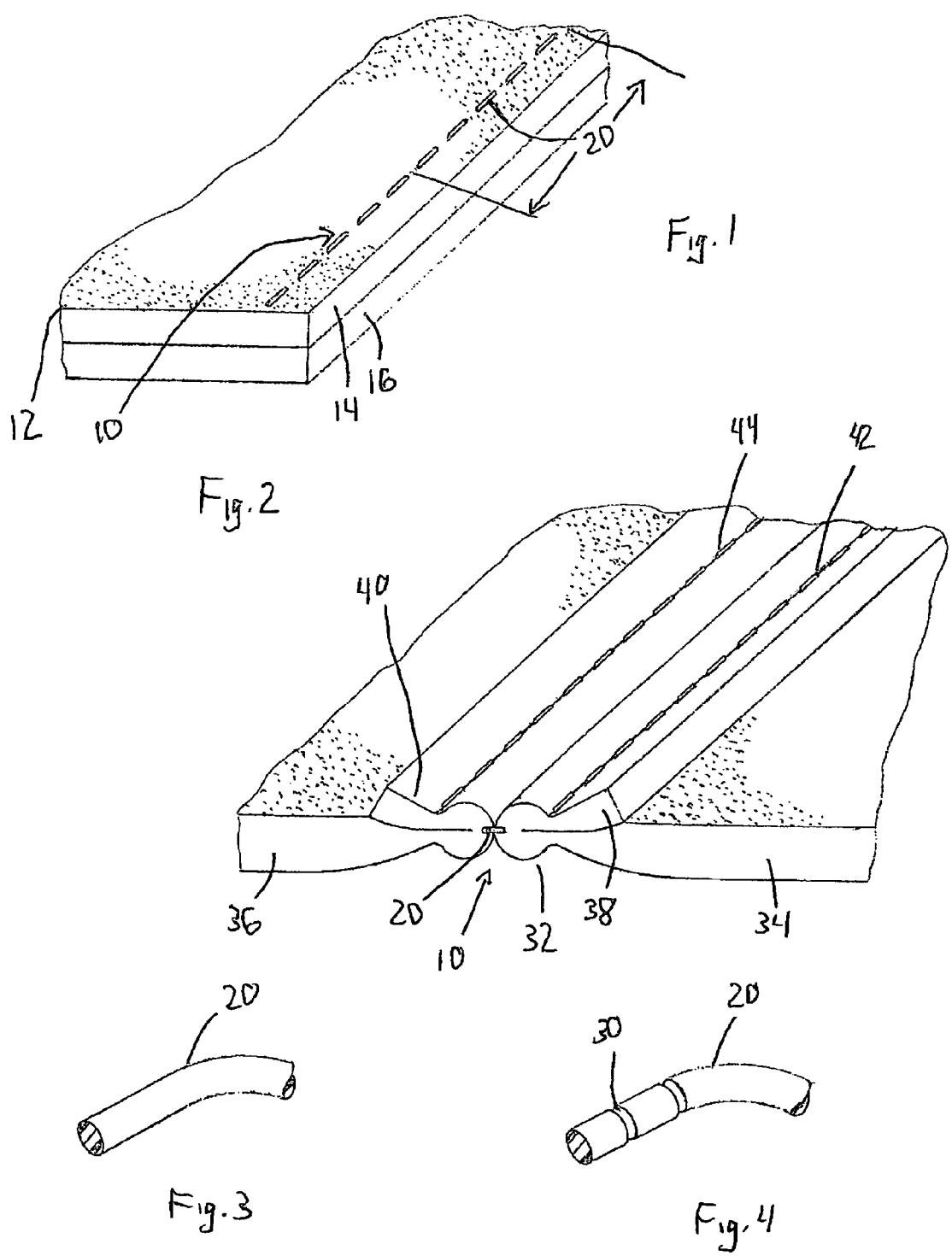

SEAT SIDE AIRBAG SEAM

BACKGROUND OF THE INVENTION

1. Field of the Invention

The subject invention generally relates to upholstery seams, and more particularly, relates to an upholstery seam for use in an automotive seat wherein multiple or two or more pieces of material are joined by a monofilament thread.

2. Description of Related Art

It is well known in the prior art of automotive vehicles to provide an airbag assembly for protection of a vehicle occupant. These prior art airbag assemblies typically are deployed from in front of a person or from a seat or roof line of an automotive vehicle. The airbags generally include an inflatable cushion structure in communication with a gas emitting inflator. When predetermined vehicle conditions occur an airbag cushion is deployed outwardly from its stored position in a dashboard, roof or seat into a position between the occupant and the interior portions of a vehicle against which the occupant might otherwise come in contact with. The use of the airbag cushion between the occupant and interior portions of the vehicle will provide a cushioning effect for the occupant against hard impacts with the interior portions of the vehicle.

Many prior art airbag systems for use in motor vehicles will have an airbag arranged within a seat. This type of airbag will generally deploy through a molded plastic cover or a sewn seam in a cover material on the seat. Many of these prior art seat airbags penetrate the seat cover by tearing open a sewn seam in the seat cover. However, there have been deficiencies in the prior art with such systems, i.e., ballooning of the seat cover may sometimes occur prior to failure of the seam, which may increase the amount of time required for the airbag to exit the seat and could result in delayed positioning of the airbag with relation to the occupant during a crash event. Furthermore, there also have been problems with the prior art seat airbags in that the seat cover material may include flaws such as holes, tears, snags, rips, etc., that may serve as potential exit points for the airbag and allow for the airbag to deploy in a unsafe manner and not offer the protection desired by the occupant of the automotive vehicle. However, many of these prior art seat airbag side impact assemblies have generally been useful in the protection of occupants, and especially provide useful in the protection against head and torso injuries.

Therefore, there is a need in the art for an improved seat side airbag seam that tears more quickly and easily and has a more consistent and complete tear along the seam. There also is a need in the art for a seam that can have its tear characteristics adjusted and tunable to specific applications within a vehicle environment. There also is a need in the art for an improved design and more efficient methodology of tearing the seam during an airbag deployment from a seat to ensure full deployment of the airbag in a crash situation.

SUMMARY OF THE INVENTION

One object of the present invention is to provide an improved seat seam for a side airbag deployment.

Another object of the present invention may be to provide a seam in a vehicle seat that will allow for quicker and easier deployment of an airbag through a seat cover.

Still another object of the present invention may be to provide a seam in a seat for deployment of a side airbag that will more completely tear along the entire seam.

Still another object of the present invention may be to provide a tunable tear seam by adjusting the thickness of a monofilament member.

Another object of the present invention may be to provide a monofilament member for use in joining, by sewing, two pieces of material of a seat at a seam directly adjacent to an airbag and/or airbag chute.

Still another object of the present invention may be to provide a way to better control the deployment process of an airbag from a seat via a seam tearing.

To achieve the foregoing objects, a seam for use in a seat of a motor vehicle is disclosed. The seam includes a first material and a second material or a combination of materials joined to the first material. The seam further includes a monofilament member used to join the first material to the second material. The monofilament member will allow for quicker and better control over the deployment of an airbag through the seam of the seat to protect the occupant of a motor vehicle.

One advantage of the present invention may be that it provides a novel and improved seam for use in a seat of a vehicle having a side airbag.

Still a further advantage of the present invention may be that it allows for quicker and easier tearing of a seam in a seat to allow for quicker deployment of an airbag from the seat.

Still another advantage of the present invention may be that it provides a more consistent tear along the seam that requires less force to produce the tear along the seam of a seat.

Still a further advantage of the present invention may be that the tear is capable of occurring along a longer seam of the automotive vehicle seat.

Still another advantage of the present invention is that it may provide a tear along the seam more quickly and have the seam tear completely thus allowing for more control over the deployment process of the airbag from the seat.

Still another advantage of the present invention is the use of a monofilament member to sew two pieces of material of a seat together adjacent to or along the airbag or airbag chute to form a tearable seam.

Still another advantage of the present invention may be to use an extrudable material to make the monofilament member which will allow for an increase in manufacturing efficiencies by not having to change the spools of monofilament member as frequently as regular thread used in prior art seams.

Other objects, features and advantages of the present invention will become apparent from the subsequent description and the appended claims, taken in conjunction with the accompanying drawings.

BRIEF DESCRIPTION OF THE DRAWINGS

FIG. 1 shows a seam for use on a seat having a side airbag according to the present invention.

FIG. 2 shows an alternate embodiment of a seam using a monofilament member according to the present invention.

FIG. 3 shows a cross sectional area of a monofilament member according to the present invention.

FIG. 4 shows an alternate embodiment of a monofilament member for use in the present invention.

DESCRIPTION OF THE EMBODIMENT(S)

Referring to the drawings, a seam 10 for use in a seat 12 of a vehicle having an airbag arranged therein is disclosed. It should be noted that the upholstery seam 10 shown in the drawings is for use on a seat 12 having a side airbag deployed therefrom. The seam 10 may be used on any type of material, such as laminate backed material, non laminate backed material, or any known covering material that is used to cover a seat, such as leather, cloth, vinyl, imitation leather, or any other known material used for vehicle seats. The use of the seam 10 according to the present invention will allow for quicker and easier tearing of the seam 10 during deployment of the airbag in a crash situation. Generally, the seam 10 according to the present invention, will be located directly adjacent to the airbag stored within the seat 12 and the portion of the seam 10 through which the airbag is to be deployed between the occupant and the interior surfaces of the vehicle. The airbag may be guided during deployment by a chute that is connected to a first 14 and second material 16 or cover of the seat 12 at the seam 10. An airbag inflator upon signal from a vehicle computer will release a hot gas to inflate the airbag and expel the airbag from the seat 12 through the seam 10 into proper position between the occupant of the vehicle and the interior surfaces of the vehicle. The seam 10 of the present invention will allow for better control over the deployment process of the airbag via the use of less force to tear the seam 10, a more consistent tearing of the seam 10, and a complete tearing of the seam 10 along the entire airbag deployment area of the seat 12. With the seam 10 tearing more quickly the airbag will more quickly be placed in its proper position between the occupant of the vehicle and the interior surfaces of the vehicle. It should further be noted that the present invention will have a tunable tear seam that will be capable of being tuned to specific tear parameters by adjusting the thickness of a monofilament member 20 which is used to join the first 14 and second seat cover material 16 at the seam 10 through which the airbag will deploy. The use of the seam 10 according to the present invention will allow for quicker tearing of the seam 10 and deployment of the airbag quicker than prior art seams.

As shown in FIG. 1, a first 14 and second upholstery panel or material 16 is used to cover a seat 12. Generally, the panels 14, 16 will be made of leather, vinyl, imitation leather, or any other material on the exterior outer layer and may have a laminated or non laminated backing depending on the seat and the vehicle for which it will be placed. A laminated back material generally has a foam backing layer laminated to the back edge thereof, while the non laminated material is the material with no backing component. The seam 10 for the seat side airbag of the present invention can be used with either laminated or non laminated upholstery materials. The first 14 and second material 16 will be aligned with one another along an edge thereof and then a join or connect seam 10 using a monofilament member or thread 20 will be sewn through the first and second materials 14, 16 along one edge thereof a predetermined distance from the edge. The monofilament member join seam 10 will have a predetermined length along a portion of the entire seam of the motor vehicle seat. Generally, the seam 10 will be used where the airbag will deploy from the seat 12. In one contemplated embodiment the monofilament member 20 will be arranged directly adjacent to a chute from which the airbag will deploy. This will allow for complete tearing of the seam 10 along the entire length of the airbag chute, thus allowing for complete deployment of the airbag in as short a time as possible during a crash event. The remainder of the seams on the seat 12 back surface and seating surface will be sewn with regular thread as used in the prior art. Any known thread in the prior art may be used for sewing seat cover materials together to form the outer covering of the seat. It should be noted that it is also contemplated to sew the entire seat 12 with the monofilament member 20, not just the seam portion of the join sew line that is arranged directly adjacent to the airbag and where the airbag will deploy from the seat. It should be noted that other stitch lines in addition to the join sew stitch may be used to create specific appearances for the outer surface of the cover material over the seat, however the join sew line 10 that connects the first cover material 14 to the second cover material 16 will have at least a portion thereof using the monofilament member or thread 20 placed in predetermined positions for deployment of the airbag through such portion of the seam 10.

The monofilament member or thread 20 is an extrudable material that has a generally circular cross section. However, it should be noted that the cross section may be of any other known shape depending on the tear requirements needed for the seam 10 in the seat 12 to allow for the airbag to deploy therethrough. Also, it should further be noted that the monofilament member 20 may be made by any other known manufacturing method other than extrusion. The monofilament member 20 will be capable of being sewn in any known stitching pattern and through any known prior art sewing machine thus reducing costs and increasing efficiency of the sewing process of the seat covers. The monofilament member 20 further creates efficiencies in the sewing process by allowing for more of the monofilament member 20 to be stored on a spool than that of traditional prior art thread. This will reduce the number of spools needed and the changing of the spool will occur less frequently because more of the monofilament member 20 can be stored or arranged on the spool. It should be noted that the monofilament member 20 generally is made of any known plastic or natural material, such as but not limited to nylon, polyester, extrudable thermoplastics or any other soft or hard plastic, composite or the like.

Generally, adjusting the thickness of the monofilament member 20 will directly effect the time needed to completely tear the seam 10 adjacent to the airbag. The thicker the diameter of the monofilament member 20 or the thicker the cross section of the monofilament member 20 the longer it will take for the seam 10 to completely tear. The thinner the diameter of the monofilament member 20 the quicker the seam 10 will completely tear, thus allowing for the airbag to deploy in a quicker time. Therefore, the use of the monofilament member 20 will ensure a quicker and easier tear of the seam 10 adjacent to the airbag while also requiring less force to tear the seam 10 in the seat 12. Also, a more consistent tear will occur along the seam 10 with the application of the force from the airbag expanding therefrom. Furthermore, with the tear of the seam 10 occurring more quickly and along the entire length of the seam 10 having the monofilament member 20, the prior art problems of bulging cover material of the seat during airbag deployment is greatly reduced. The use of the monofilament member 20 to create the seam 10 for deployment of an airbag therethrough is so efficient that the longer the tear of the seam that is needed, i.e., the larger the airbag that has to be deployed from the seat 12, the quicker the seam 10 will tear in comparison to the prior art, thus offering better control over the deployment of the airbag as a whole. Therefore, you can tune the tearing of the seam 10 by adjusting the thickness of the monofilament member 20 to any predetermined thickness and furthermore you can also tune the monofilament member 20 characteristics by changing the chemistry of the particular material used to make the monofilament member 20 to predetermined specifications that will allow for tearing of the monofilament member 20 at predetermined times during the crash sequence. It is also contemplated to treat the monofilament member 20 with chemicals to ensure the integrity and durability of the monofilament member 20 in the seat over the life of a vehicle.

Therefore, there is a direct correlation between the strength of the monofilament member 20 and the speed at which it will tear along the seam 10 thus effecting the deployment time of the airbag from the seat to cushion the occupant from the interior surfaces of the vehicle. It is also contemplated to effect the time for the monofilament member 20 to break and thus tear the seat at the seam 10 by performing mechanical operations on a surface of the monofilament member 20. These mechanical operations may include but are not limited to any known mechanical operations such as scoring, placing notches 30 on an outer surface thereof, having grooves arranged in any known pattern around an outer surface thereof, even having a circumferential bore extending along the entire length thereof, etc. Therefore, these and any other known mechanical operations may be performed to also effect the speed at which the seam 10 will tear along the monofilament member 20 portion of the seam 10. It is contemplated that the diameter of the monofilament member 20 may be anywhere from a few microns up to multiple millimeters depending on the design requirements and environment in which the seam 10 will be placed in the seat in the vehicle.

FIG. 2 shows an alternate embodiment used for the seam 10. FIG. 2 shows the use of the monofilament member 20 in a french seam 32 well known in the prior art. As shown in FIG. 2, the french seam 32 includes a first and second panel or material 34, 36 that will be joined along a stitching line that is a join connection sew line 10 using the monofilament member 20 as described above. The join sew line 10 is positioned inboard of the longitudinal edges of the panels 34, 36 respectively. The join sew line 10 runs the entire length of the panel 34, 36 or just at predetermined portion of the panel 34, 36 directly adjacent to the airbag or the chute of the airbag. However, it should be noted that it is also contemplated to use the monofilament member 20 along all join sew lines of the vehicle seat as discussed above. The use of the join sew line 10 will leave a predetermined flap edge 38, 40 that will be capable of being folded over to create the french seam 32 look for the upholstered panels 34, 36. The flap 38 of the first panel 34 is folded over and then an appropriate stitch line 42 is stitched through a top surface of the upholstered panel 34 and the flap 38. The stitch line 42 is run adjacent to the join seam 10. Next the flap 40 of the second panel 36 of the upholstered material is folded over and a second stitch line 44 is stitched through the second panel 36 and second flap 40 adjacent to the join sew line 10. Therefore, the join sew line 10 will be sewn with the monofilament member 20 a predetermined length along the seam 10 of the seat such that deployment of the airbag will occur through the opening defined by the length of the monofilament member 20. The other portions of the seat will use regular thread thereon in one embodiment. However, it is also contemplated to use the monofilament member 20 along the entire join seam 10 of all seating surfaces in another contemplated embodiment. Once the seat body covers or cloth are sewn together with the monofilament member 20 a predetermined length thereof, the cover will be placed over the seat such that the monofilament member portion of the join seam 10 is arranged directly adjacent to an airbag chute through which the airbag will deploy from the seat.

It should be noted that measurable improvement in the speed in which the seam 10 tears and the airbag is deployed from a seat has been measured with the present invention of a seam 10 using a monofilament member 20 therein. The speed of the tear increases such that the airbag will more fully deploy in a quicker time thus creating a safer environment for the occupant of the motor vehicle. Such time increases have been measured as saving many milliseconds in deployment of the airbag via the tearing of the seam 10 in a quicker and more efficient manner. The use of the monofilament member 20 for the tear seam will allow for better directional control of the airbag to more precise locations within the motor vehicle between the occupant in the interior portions of the vehicle.

The present invention has been described in an illustrative manner. It is to be understood that the terminology which has been used is in intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A seat for use in a vehicle, the seat having an airbag arranged therein, said seat comprising:
   a first material covering a portion of the seat;
   a second material joined to said first material; and
   a seam formed between said first material and said second material;
   wherein a monofilament member is sewn through the seam to create a tear portion;
   wherein the airbag tears the tear portion and first exits the seat through the tear portion; and
   wherein said monofilament member is used on all seams in the seat.

2. The seat of claim 1, wherein said monofilament member generally has a circular cross section.

3. The seat of claim 2, wherein said monofilament member allows for quicker deployment of the airbag from the seat with a low force and more consistent and complete tear of the tear portion.

4. The seat of claim 1, wherein said monofilament member creates a tunable tear for said tear portion by adjusting a thickness of said monofilament member.

5. The seat of claim 1, wherein said monofilament member is extrudable and has a chemistry that is changeable to allow for predetermined strength and tear characteristics for said monofilament member.

6. The seat of claim 1, wherein said monofilament member is made of a polyester, nylon, plastic, or natural material.

7. The seat of claim 1, wherein said seam formed between said first material and said second material is a French seam.

8. A seat for use in a vehicle, the seat having an airbag arranged therein, said seat comprising:
   a first material covering a portion of the seat;
   a second material joined to said first material with a join seam; and
   a monofilament member sewn through said join seam connecting said first material and said second material to create a tear portion;
   wherein the airbag tears said tear portion and first exits the seat through said tear portion;
   and wherein said monofilament member is used on all seams in the seat.

* * * * *